United States Patent
Naidu et al.

(10) Patent No.: US 12,373,313 B2
(45) Date of Patent: *Jul. 29, 2025

(54) VIRTUAL MACHINE BACKUP FROM COMPUTING ENVIRONMENT TO STORAGE ENVIRONMENT

(71) Applicant: NetApp Inc., San Jose, CA (US)

(72) Inventors: Abhishek Naidu, San Jose, CA (US); Jose Mathew, Santa Clara, CA (US); Ling Zheng, Saratoga, CA (US); Ravindra Kuramkote, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,196

(22) Filed: Dec. 14, 2023

(65) Prior Publication Data
US 2024/0134759 A1     Apr. 25, 2024

Related U.S. Application Data

(63) Continuation of application No. 16/856,367, filed on Apr. 23, 2020, now Pat. No. 11,853,104.
(Continued)

(51) Int. Cl.
*G06F 9/455*     (2018.01)
*G06F 3/06*      (2006.01)
*G06F 11/14*     (2006.01)

(52) U.S. Cl.
CPC ........ *G06F 11/1469* (2013.01); *G06F 3/0619* (2013.01); *G06F 3/065* (2013.01);
(Continued)

(58) Field of Classification Search
CPC ....... G06F 9/45558; G06F 2009/45562; G06F 3/065; G06F 3/0619; G06F 3/0664; G06F 3/0673
See application file for complete search history.

(56) References Cited

U.S. PATENT DOCUMENTS 5,515,499 A  5/1996 Allen et al.
5,907,672 A  5/1999 Matze et al.
(Continued)

FOREIGN PATENT DOCUMENTS

CN   105094948 A   11/2015
WO   2016099116 A1  6/2016

OTHER PUBLICATIONS

Final Office Action mailed on Mar. 24, 2023 for U.S. Appl. No. 16/856,367, filed Apr. 23, 2020, 26 pages.
(Continued)

*Primary Examiner* — April Y Blair
*Assistant Examiner* — Zhi Chen
(74) *Attorney, Agent, or Firm* — Cooper Legal Group, LLC

(57) ABSTRACT

Techniques are provided for backing up virtual machines from a computing environment to a storage environment. A virtual machine agent is utilized to generate a snapshot of the virtual machine. Metadata comprising a snapshot identifier of the snapshot and virtual disk information of virtual disks captured by snapshot is generated at the computing environment. The metadata is retrieved and used to create a metafile that is transferred to the storage environment within which snapshots of the virtual machine are to be stored. The snapshot is retrieved from the computing environment and is packaged into a snapshot package having a protocol format used by the storage environment. The snapshot package is transferred to the storage environment.

20 Claims, 10 Drawing Sheets

Related U.S. Application Data

(60) Provisional application No. 62/867,504, filed on Jun. 27, 2019.

(52) U.S. Cl.
CPC .......... *G06F 3/0664* (2013.01); *G06F 3/0673* (2013.01); *G06F 9/45558* (2013.01); *G06F 11/1451* (2013.01); *G06F 11/1458* (2013.01); *G06F 11/1464* (2013.01); *G06F 11/1484* (2013.01); *G06F 2009/45562* (2013.01); *G06F 2009/45575* (2013.01); *G06F 2201/80* (2013.01); *G06F 2201/815* (2013.01); *G06F 2201/84* (2013.01)

(56) References Cited

U.S. PATENT DOCUMENTS

| | | | |
|---|---|---|---|
| 6,268,924 B1 * | 7/2001 | Koppolu | G06F 9/4488 358/1.15 |
| 8,060,474 B2 | 11/2011 | Beatty et al. | |
| 8,255,650 B1 | 8/2012 | Gruttadauria et al. | |
| 8,719,286 B1 | 5/2014 | Xing et al. | |
| 8,983,961 B2 | 3/2015 | Chan et al. | |
| 9,292,327 B1 | 3/2016 | Von et al. | |
| 9,483,485 B1 | 11/2016 | Chockalingam et al. | |
| 9,665,437 B2 | 5/2017 | Bhargava et al. | |
| 9,740,520 B1 | 8/2017 | Sarda et al. | |
| 9,740,577 B1 | 8/2017 | Chakraborty et al. | |
| 9,898,371 B2 | 2/2018 | Kumarasamy et al. | |
| 9,940,203 B1 | 4/2018 | Ghatnekar et al. | |
| 10,146,634 B1 | 12/2018 | Bishop et al. | |
| 10,152,387 B1 | 12/2018 | Chakraborty et al. | |
| 10,169,067 B2 | 1/2019 | Dornemann | |
| 10,754,741 B1 | 8/2020 | Sethuramalingam et al. | |
| 10,796,473 B1 * | 10/2020 | Lim | G06T 19/006 |
| 10,810,035 B2 | 10/2020 | Guturi et al. | |
| 10,824,455 B2 | 11/2020 | Arikatla et al. | |
| 11,023,329 B1 | 6/2021 | Per et al. | |
| 11,025,717 B2 | 6/2021 | Liu et al. | |
| 11,099,956 B1 | 8/2021 | Polimera et al. | |
| 11,169,835 B1 * | 11/2021 | Duong | G06F 9/4856 |
| 11,188,422 B2 | 11/2021 | Cisler et al. | |
| 11,323,259 B2 | 5/2022 | Maximov et al. | |
| 11,567,792 B2 | 1/2023 | Guturi et al. | |
| 11,615,001 B2 | 3/2023 | Naidu et al. | |
| 11,650,886 B2 | 5/2023 | Mathew et al. | |
| 11,853,104 B2 | 12/2023 | Naidu et al. | |
| 11,868,213 B2 | 1/2024 | Zheng et al. | |
| 11,977,461 B2 | 5/2024 | Naidu | |
| 12,045,144 B2 | 7/2024 | Mathew et al. | |
| 2002/0124077 A1 * | 9/2002 | Hill | H04N 7/17318 348/E7.071 |
| 2009/0147302 A1 * | 6/2009 | Yang | G06F 3/1234 358/1.15 |
| 2010/0077160 A1 | 3/2010 | Liu et al. | |
| 2012/0089814 A1 | 4/2012 | Gupta et al. | |
| 2012/0117311 A1 | 5/2012 | Hong | |
| 2013/0061293 A1 | 3/2013 | Mao | |
| 2013/0080397 A1 | 3/2013 | Payne et al. | |
| 2013/0159359 A1 | 6/2013 | Kumar et al. | |
| 2013/0166511 A1 | 6/2013 | Ghatty et al. | |
| 2013/0238562 A1 | 9/2013 | Kumarasamy et al. | |
| 2014/0032838 A1 | 1/2014 | Takeuchi et al. | |
| 2014/0074790 A1 | 3/2014 | Berman et al. | |
| 2014/0195503 A1 | 7/2014 | Kao et al. | |
| 2014/0196056 A1 | 7/2014 | Kottomtharayil et al. | |
| 2014/0244818 A1 | 8/2014 | Taine et al. | |
| 2015/0127618 A1 | 5/2015 | Alberti et al. | |
| 2016/0154707 A1 | 6/2016 | Kumarasamy et al. | |
| 2017/0116219 A1 | 4/2017 | Shetty | |
| 2017/0171311 A1 | 6/2017 | Tennie et al. | |
| 2017/0171340 A1 | 6/2017 | Kurita | |
| 2018/0113622 A1 | 4/2018 | Sancheti | |
| 2018/0129567 A1 | 5/2018 | Kumarasamy | |
| 2018/0157538 A1 | 6/2018 | Raikov et al. | |
| 2019/0104196 A1 | 4/2019 | Li et al. | |
| 2019/0235971 A1 | 8/2019 | Botelho et al. | |
| 2020/0042344 A1 | 2/2020 | Ao et al. | |
| 2020/0125386 A1 | 4/2020 | Busick et al. | |
| 2020/0133502 A1 | 4/2020 | Yang et al. | |
| 2020/0183731 A1 | 6/2020 | Dornemann | |
| 2020/0272492 A1 * | 8/2020 | Guturi | G06F 3/067 |
| 2020/0409738 A1 | 12/2020 | Naidu et al. | |
| 2020/0409797 A1 | 12/2020 | Mathew et al. | |
| 2020/0409803 A1 | 12/2020 | Naidu et al. | |
| 2021/0035012 A1 * | 2/2021 | Beaty | G06N 20/00 |
| 2021/0064413 A1 | 3/2021 | Guturi et al. | |
| 2021/0406129 A1 | 12/2021 | Zheng et al. | |
| 2022/0318188 A1 | 10/2022 | Subramanian et al. | |
| 2022/0350642 A1 | 11/2022 | Poddar et al. | |
| 2023/0012869 A1 | 1/2023 | Suarez et al. | |
| 2023/0087493 A1 | 3/2023 | Busick et al. | |
| 2023/0088202 A1 | 3/2023 | Myers et al. | |
| 2023/0115438 A1 | 4/2023 | DeGraaf et al. | |
| 2023/0221980 A1 | 7/2023 | Guturi et al. | |
| 2023/0222041 A1 | 7/2023 | Muniraju et al. | |
| 2023/0229568 A1 | 7/2023 | Naidu et al. | |
| 2023/0244466 A1 | 8/2023 | Shah et al. | |
| 2023/0281088 A1 | 9/2023 | Mathew et al. | |
| 2023/0401088 A1 | 12/2023 | Poddar et al. | |
| 2023/0409381 A1 | 12/2023 | Poddar et al. | |
| 2024/0378121 A1 | 11/2024 | Mathew et al. | |

OTHER PUBLICATIONS

Non-Final Office Action mailed on Sep. 6, 2022 for U.S. Appl. No. 16/856,367, filed Apr. 23, 2020, 24 pages.
Notice of Allowance mailed on Aug. 9, 2023 for U.S. Appl. No. 16/856,367, filed Apr. 23, 2020, 08 pages.
Notice of Allowance mailed on Dec. 22, 2023 for U.S. Appl. No. 18/190,172, filed Mar. 27, 2023, 8 pages.
Notice of Allowance mailed on Jul. 3, 2023 for U.S. Appl. No. 16/856,367, filed Apr. 23, 2020, 17 pages.
Notice of Allowance mailed on Sep. 25, 2023 for U.S. Appl. No. 16/856,367, filed Apr. 23, 2020, 02 pages.
Notice of Allowance mailed on May 3, 2024 for U.S. Appl. No. 18/317,298, filed May 15, 2023, 02 pages.
Notice of Allowance mailed on Mar. 11, 2024 for U.S. Appl. No. 18/317,298, filed May 15, 2023, 09 pages.
Notice of Allowance mailed on Apr. 2, 2024 for U.S. Appl. No. 18/190,172, filed Mar. 27, 2023, 02 pages.
International Search Report and Written Opinion for Application No. PCT/US2020/039038, mailed on Sep. 25, 2020, 10 pages.
Non-Final Office Action mailed on Aug. 2, 2022 for U.S. Appl. No. 16/856,322, filed Apr. 23, 2020, 13 pages.
Non-Final Office Action mailed on Aug. 31, 2023 for U.S. Appl. No. 18/190,172, filed Mar. 27, 2023, 12 pages.
Non-Final Office Action mailed on Jul. 21, 2022 for U.S. Appl. No. 16/856,249, filed Apr. 23, 2020, 13 pages.
Notice of Allowance mailed on Apr. 14, 2023 for U.S. Appl. No. 16/856,249, filed Apr. 23, 2020, 2 pages.
Notice of Allowance mailed on Dec. 1, 2022 for U.S. Appl. No. 16/856,322, filed Apr. 23, 2020, 5 pages.
Notice of Allowance mailed on Jan. 11, 2023 for U.S. Appl. No. 16/856,249, filed Apr. 23, 2020, 8 pages.

* cited by examiner

VIRTUAL MACHINE BACKUP FROM COMPUTING ENVIRONMENT TO STORAGE ENVIRONMENT

RELATED APPLICATION

This application claims priority to and is a continuation of U.S. patent application Ser. No. 16/856,367, titled "VIRTUAL MACHINE BACKUP FROM COMPUTING ENVIRONMENT TO STORAGE ENVIRONMENT" and filed on Apr. 23, 2020, which claims priority to and the benefit of U.S. Provisional Application No. 62/867,504, titled "BACKUP AND RESTORE BETWEEN A COMPUTING ENVIRONMENT AND A STORAGE ENVIRONMENT" and filed on Jun. 27, 2019, which are incorporated herein by reference.

BACKGROUND

A computing environment may be configured to host virtual machines that are made accessible to client devices. The computing environment may comprise a virtual machine management platform, a hypervisor (e.g., an ESX server), and/or other hardware and software used to host and manage the virtual machines. The hypervisor utilizes software to abstract processor, memory, storage, and networking resources for use by one or more virtual machines. Each virtual machine runs its own operating system (a guest operating system) and applications. The hypervisor creates logical pools of system resources from the same physical resources. The logical pools of system resources are each assigned to individual virtual machines to enable multiple virtual machines to separately share the same physical resources. A virtual machine may execute a guest operating system that stores user data, application data, and operating system data within virtual disks.

Unfortunately, the computing environment, such as the virtual machine management platform, may not provide adequate data protection and storage functionality required by clients. In an example, the computing environment may not provide adequate levels of deduplication, compression, encryption, backup and restore functionality, incremental backup and restore functionality, and/or other levels of storage functionality required by the clients. For example, the virtual machine management platform may be capable of generating a snapshot of a virtual machine. However, such snapshots are not backed up and retained by the computing environment due to overhead and cost of maintaining snapshots within the computing environment. Thus, the virtual machine host platform does not provide adequate data protection and storage efficiency for backing up and restoring data of the virtual machines in a scalable manner.

DETAILED DESCRIPTION

Figure 1:
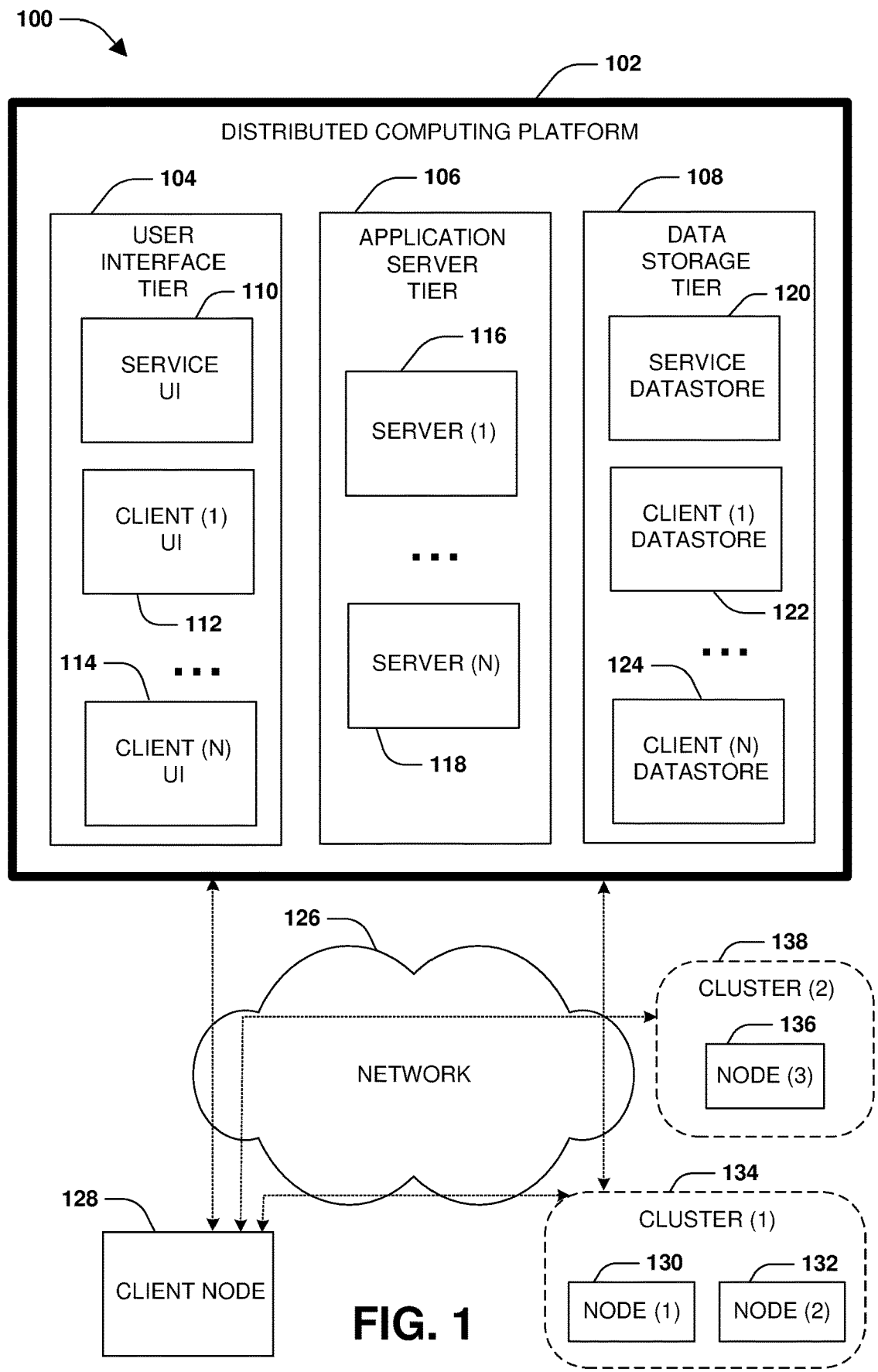
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A computing environment provides virtualization layer services and virtual machine hosting functionality to host virtual machines that can be accessed by client devices for storing data, executing applications, hosting services, etc. For example, the computing environment may comprise a hypervisor, such as an Elastic Sky X (ESX) server (e.g., a virtualization layer that abstracts processor, memory, storage, networking resources into one or more virtual machines), configured to host virtual machines. The computing environment may comprise a virtual machine management platform that provides a variety of services for managing virtual machines, such as the creation of snapshots of virtual machines.

A virtual machine may execute a guest operating system that can be accessed by a client device. The client device can use the guest operating system to execute applications, create and store data within virtual disks used by the virtual machine to store data, etc. The computing environment may provide basic storage and management functionality for the virtual machines, such as by maintaining virtual disks within which virtual machines can store data, along with the ability to generate snapshot backups of the virtual machines by creating snapshots of the virtual disks. However, the computing environment such as the virtual machine management platform may lack adequate data protection and storage functionality for providing a level of data protection and storage efficiency required by clients for backing up and restoring data of the virtual machines in a scalable manner. For example, snapshots generated by the virtual machine management platform are not generally retained long term by the computing environment as backups over time due to overhead and cost of maintaining snapshots within the computing environment. Thus, the virtual machine management platform does not provide adequate data protection and storage efficiency for backing up and restoring data of the virtual machines in a scalable manner.

In contrast, a storage environment (e.g., a storage controller, a storage virtual machine, hardware, software, or combination thereof that hosts a storage operating system that provides storage functionality to clients, such as by exposing volumes, aggregate, and file systems to client devices) may provide robust data protection and storage functionality, such as long term scalable storage, backup functionality, restore functionality, incremental backup and restore functionality, deduplication, encryption, compression, data migration between various types of storage such as on-premise storage and cloud storage, snapshot creation, snapshot storage, snapshot management, etc. Unfortunately, the computing environment and the storage environment are unable to natively communicate and coordinate with one another in order to perform various operations, such as backup and restore operations, snapshot creation operations, etc. This is because the storage environment may implement specific application programming interfaces (APIs), communication protocols, data storage formats, commands and operations, and/or other services and functionality that are not natively compatible with specific APIs, communication protocols, data storage formats, commands and operations, and/or other services and functionality implemented by the computing environment. Thus, the robust storage functionality of the storage environment cannot be natively leveraged to provide data protection and storage efficiency for the virtual machines hosted within the computing environment because the computing environment and the storage environment are not natively compatible with one another.

Accordingly, as provided herein, agents (e.g., proxies) are used to interact with the computing environment and the storage environment in order to facilitate the backing up of virtual machines within the computing environment to the storage environment. In particular, a virtual machine agent (a virtual machine proxy) is configured to be compatible with APIs, communication protocols, data storage formats, commands and operations, and/or other services and functionality of the computing environment. For example, the virtual machine agent (can interact with APIs of the virtual machine management platform in order to invoke the virtual machine management platform to create a snapshot of a virtual machine hosted by a hypervisor within the computing environment.

The virtual machine agent can access metadata of the snapshot created within the computing environment. The metadata may be tracked within memory of the virtual machine agent. The metadata may be received as a volume attribute from the computing environment (e.g., as an attribute of a volume by the virtual machine agent), such as where the computing environment serializes the metadata into a metadata image that is transmitted as volume attributes. The virtual machine agent may process the metadata to create a metafile to store within the storage environment. The metafile comprises various information about the snapshot, such as a snapshot identifier of the snapshot, virtual disk information of virtual disks captured by the snapshot, a disk layout of the virtual disks, disk attributes of the virtual disks, file information of files within the virtual disks, a list of inodes of the files, and/or other information.

In this way, the metadata describing the snapshot is stored within the storage environment before snapshot data of the snapshot is retrieved, packaged (reformatted), and stored within the storage environment. Thus, if an error or issue occurs during the transfer of the snapshot data, the metafile can be used by any agent to restart or resume the transfer. That is, the agents are stateless and do not require any persistent storage in the computing environment to keep a state of an operation in process and/or to recover a backup or perform a restore if there is a restart of an agent in the middle of the operation.

A storage agent (a storage proxy) writes the metafile from the virtual machine agent into storage of the storage environment, such as within a volume of the storage environment. The storage agent may be implemented within the storage environment by a storage operating system, for example. Also, the storage agent receives the snapshot data, destined for the storage environment, from the virtual machine management platform of the computing environment. Because the storage environment supports particular APIs, communication protocols, data storage formats, commands and operations, and/or other services and functionality that may be natively incompatible with the computing environment and the virtual machine management platform, the storage agent packages the snapshot into a snapshot package. That is, the snapshot may not be in a format natively supported by the storage environment. The snapshot package has a protocol format supported by the storage environment, such as a format used by a snapshot management service of the storage environment. In this way, the snapshot package is transferred to the storage environment in a format understood and interpretable by the snapshot management service and the storage of the storage environment.

In an embodiment, the snapshot package may be stored within a folder of the volume of the storage environment based upon the folder being designated for backups of the virtual machine. Each snapshot package (e.g., each snapshot of each virtual disk of the virtual machine) of the virtual machine may be stored as a file or other type of object (e.g., an object within object storage) within the folder designated for backups of the virtual machine at the storage environment. The storage environment may provide various data protection and storage efficiency for the snapshot package backups of the virtual machine, such as long term retention, redundant storage of snapshot packages, migration of snapshot packages amongst various types of storage and storage providers such as migration between on-premise storage and cloud storage, compression, deduplication, encryption, etc. In this way, an initial baseline backup of the entire virtual machine may be performed.

Once the baseline backup of the virtual machine is complete, incremental backups of the virtual machine may be performed. For example, a metafile used in the prior backup (e.g., the baseline backup or a prior incremental backup) may be retrieved. This metafile will provide a mapping between an identifier of a prior snapshot in the storage environment and an identifier of the prior snapshot in the computing environment. Thus, one of the agents can collect an incremental between the latest snapshot identifier in the computing environment and the prior snapshot identifier in the computing environment. An API of the virtual machine management platform may expect a snapshot identifier of the prior snapshot created in the prior backup in order to create a new snapshot for the current incremental backup. The new snapshot may correspond to a difference between a current state of the virtual machine and a prior state of the virtual machine captured by the prior snapshot (e.g., changed data within the virtual disks of the virtual machine since the prior backup).

Accordingly, the snapshot identifier within the metafile of the prior backup is transmitted by the virtual machine agent to the virtual machine management platform, along with an instruction for the virtual machine management platform to create the new snapshot to use for an incremental backup of the virtual machine to the storage environment. The incremental data (e.g., the changed data) within the new snapshot is read by the virtual machine agent and transformed into a new snapshot package by the storage agent. An updated metafile corresponding to the new snapshot is created from metadata of the new snapshot and is stored within the storage environment. Furthermore, the new snapshot package is stored within the storage environment (e.g., as opposed to within the computing environment in order to conserve resources of the computing environment).

Agents may be implemented in various manners and at various locations. In an embodiment, a virtual machine agent and a storage agent may be implemented in a manner where the virtual machine agent and the storage agent may be hosted together or at separate locations or across multiple locations (e.g., an agent may be implemented within an on-premise device, within a cloud computing environment, as a virtual machine, within the computing environment, within the storage environment, etc.). In an embodiment, a single agent may host both the virtual machine agent as a virtual machine proxy and the storage agent as a storage proxy, and thus the single agent may be hosted at various locations or across multiple locations.

A set of agents may be implemented as stateless agents capable of taking over for one another for load balancing purposes or if an agent fails. Each agent may implement or may be communicatively associated with a virtual machine agent and a storage agent (e.g., the virtual machine agent and/or the storage agent may be integrated into an agent component or may be accessible to the agent component over a communication channel). Because metafiles associated with snapshots captured by the virtual machine platform and stored as backups within the storage environment are stored within the storage environment for use by the set of agents, the agents can be stateless. Each agent can be stateless because the metafiles comprise the necessary information that any agent would use to perform a next backup, restart a failed backup, and/or resume a backup using information within the metafiles. This allows for backup jobs to be load balanced across the set of agents, thus providing the ability to alleviate an overloaded agent by transferring backup workflow from that agent to a less burdened agent. This also allows for an agent to takeover for a failed agent.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that the file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
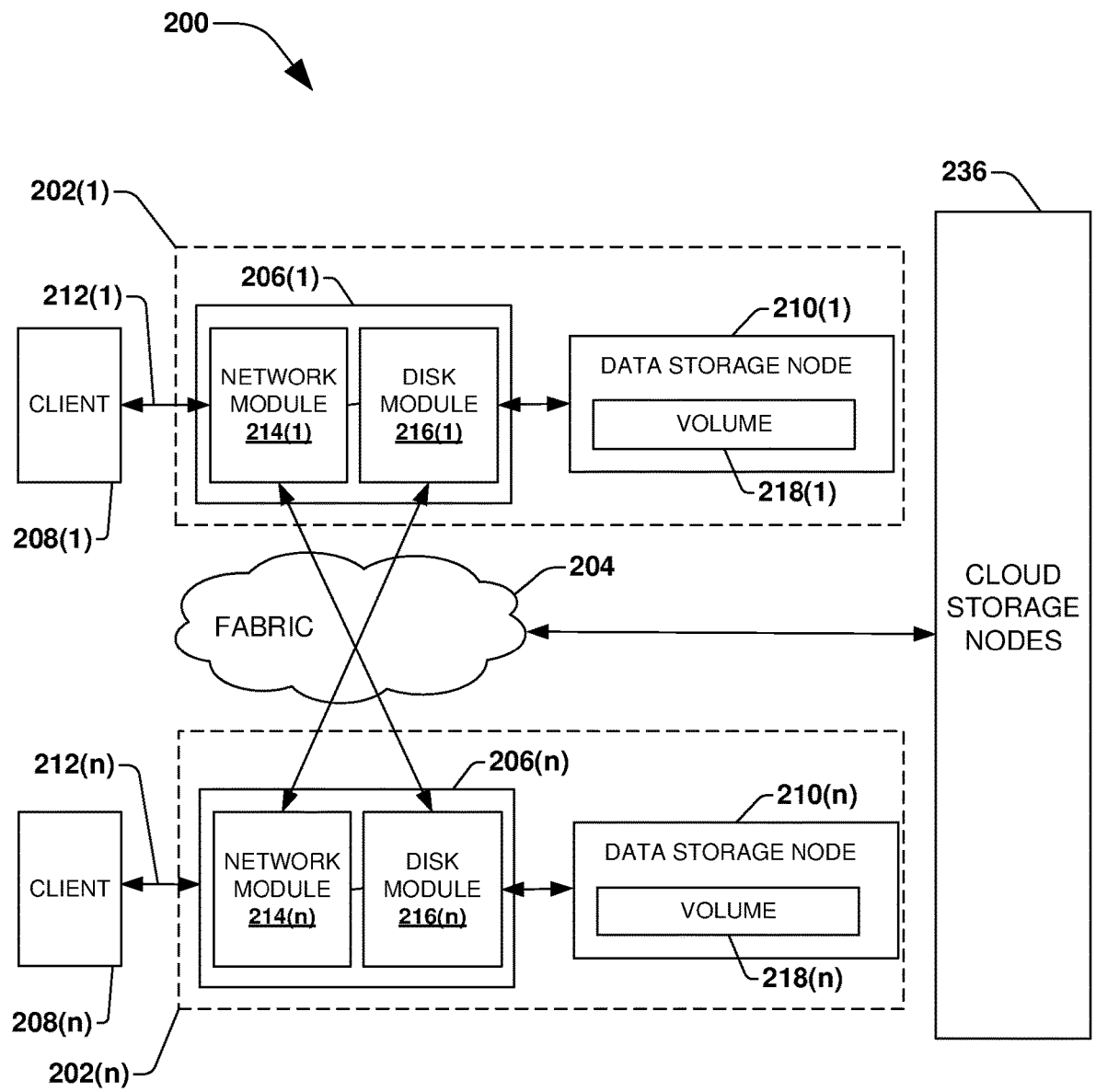
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
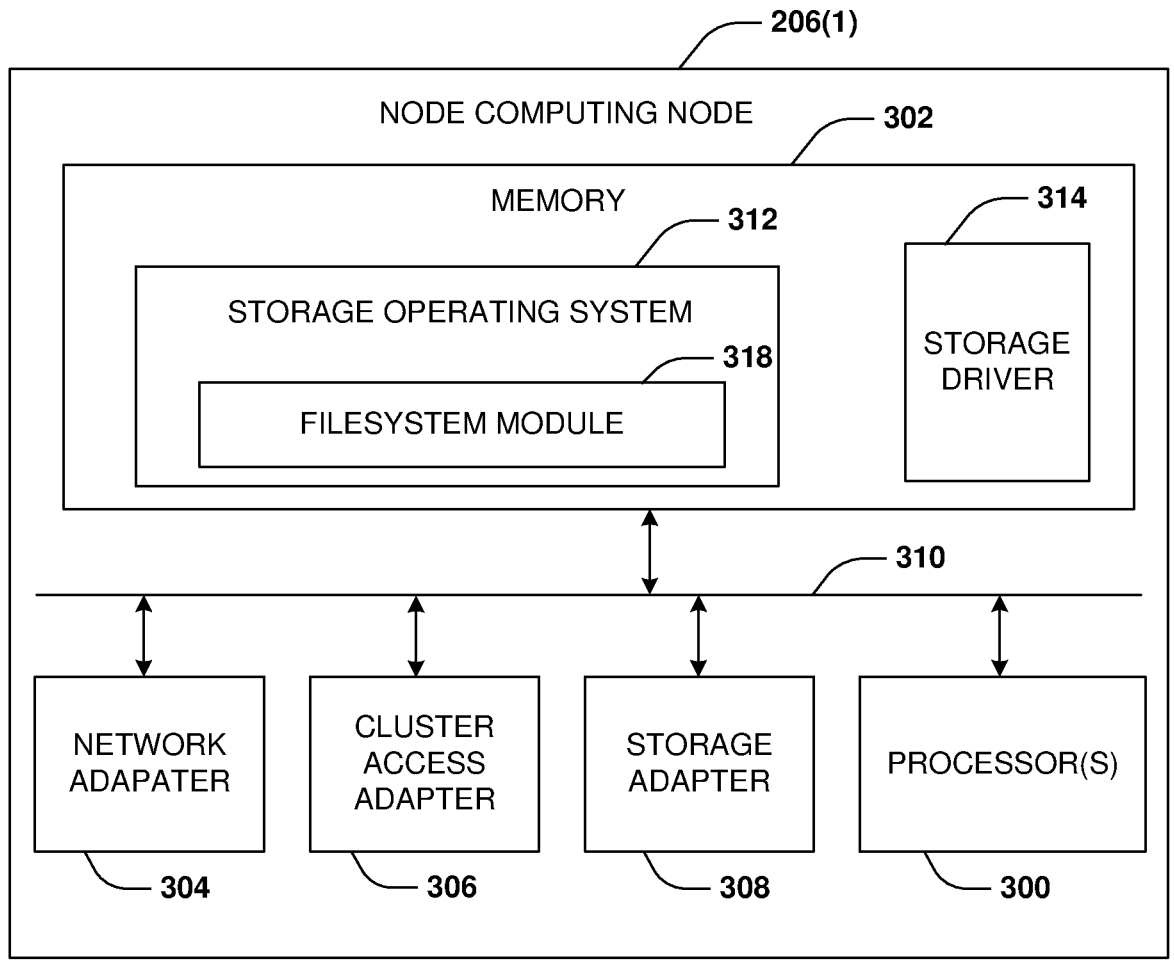
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, including for example backing up virtual machines from a computing environment to a storage environment as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
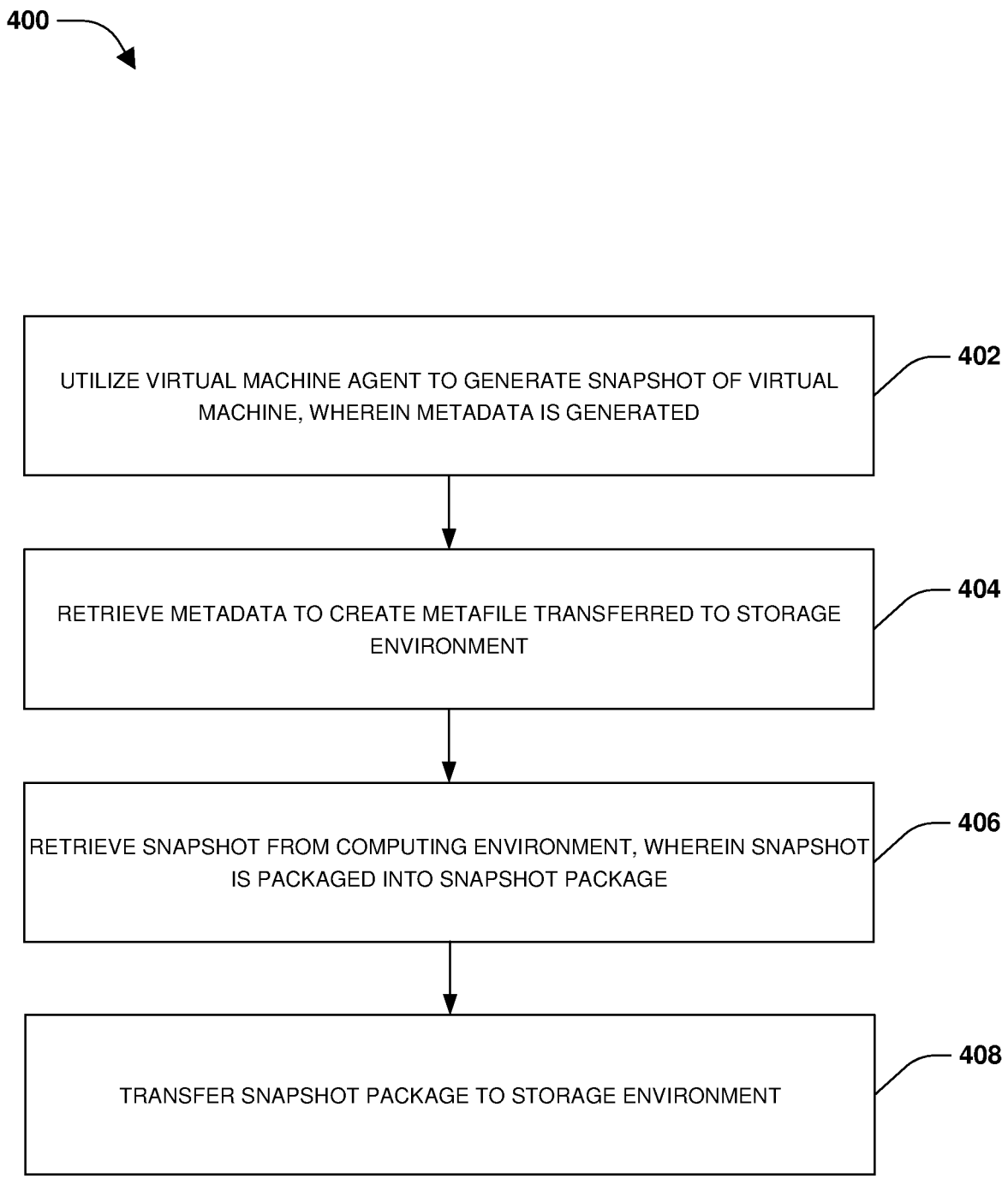
FIG. 4 is a flow chart illustrating an example method for virtual machine backup from a computing environment to a storage environment.

One embodiment of performing backups such as full backups and/or incremental backups of virtual machines, hosted within a computing environment, to a storage environment is illustrated by an exemplary method 400 of FIG. 4, which is further described in conjunction with system 500 of FIGS. 5A-5E. A computing environment 508 may comprise a hypervisor 501 configured to host virtual machines that can be accessed by client devices. For example, the hypervisor 501 of the computing environment 508 may host a virtual machine 510 that stores user data, application data, and/or operating system data within virtual disks stored within the computing environment 508 (e.g., a virtual machine within the computing environment 508 stores data within a virtual disk within the computing environment 508, which may be backed up to a storage environment 514 using the techniques described herein). The computing environment 508 may comprise a virtual machine management platform 503 (identified as virtual machine management platform 503 in FIG. 5A as well) configured to provide various virtualization services and functionality, such as creating virtual machines, deleting virtual machines, allocating storage and virtual disks for virtual machines, creating snapshots of virtual machines, etc. However, the computing environment 508 does not provide adequate data protection for the virtual machines. For example, the cost and overhead associated with storing snapshots of all of the virtual machines hosted by the computing environment 508 may be prohibitively expensive (e.g., the cost to store and long term retain multiple snapshots for thousands of virtual machines would be prohibitively expensive). The computing environment 508 may correspond to any type of computing environment, such as the distributed computing platform 102 of FIG. 1.

In contrast, a storage environment 514 may comprise a storage operating system and/or storage functionality, such as replication functionality, data mirroring functionality, backup functionality, restore functionality, deduplication, compression, storage virtual machine hosting, a snapshot management service, a file system that stores data within volumes, LUNs, aggregates, etc. Unfortunately, the computing environment 508 and the storage environment 514 are unable to natively communicate and coordinate with one another in order to perform various operations such as to create snapshots of the virtual machines hosted within the computing environment 508, and to backup those snapshots to the storage environment 514. This is because the storage environment 514 may implement specific application programming interfaces (APIs), communication protocols, data storage formats, commands and operations, and/or other services and functionality that are not compatible with APIs, communication protocols, data storage formats, commands and operations, and/or other services and functionality implemented by the computing environment 508. Thus, the robust storage functionality of the storage environment 514 cannot be natively leveraged to provide data protection and storage efficiency for the virtual machines hosted within the computing environment 508 such as the virtual machine 510 because the computing environment 508 and the storage environment 514 are not natively compatible with one another. The storage environment 508 may correspond to any type of storage environment, such as the data storage node 210(1) of FIG. 2, the node 206(1) of FIG. 3, etc.

Accordingly, as provided herein, an agent component 502 is configured to interact with the computing environment 508 through a virtual machine agent 504 (e.g., a virtual machine proxy) and the storage environment 514 through a storage agent 506 (e.g., a storage proxy). The agent component 502 utilizes the virtual machine agent 504 and the storage agent 506 to provide storage functionality of the storage environment 514 for the computing environment 508, such as to back up the virtual machine 510 and virtual disks of the virtual machine 510 from the computing environment 508 to the storage environment 514 and/or to restore the backed up data from the storage environment 514 to the computing environment 508 to restore the virtual machine 510. The agent component 502 may orchestrate full backups and full restores of virtual machines and/or incremental backups and incremental restores of the virtual machines hosted by the computing environment 508.

The agent component 502 interacts with the virtual machine agent 504 in order to communicate with the computing environment 508. For example, the agent component 502 interacts with the hypervisor 501 to identify virtual machines hosted by the hypervisor 501, virtual disks stored within the computing environment 508, and/or other information of the computing environment 508. The agent component 502 interacts with the virtual machine management platform 503 in order to invoke various functionality provided by the virtual machine management platform 503, such as creating, deleting, or managing virtual machines, creating, deleting, or managing snapshots of the virtual machines, etc.

The virtual machine agent 504 may be capable of reformatting, modifying (e.g., adding, removing, and/or replacing parameters, variables, statements, text, and/or other data within commands), and/or replacing (e.g., replacing a command with another command mapped to the command and formatted to be compatible with the computing environment 508) commands and data from the agent component 502 and the storage environment 514 into commands that are compatible with the computing environment 508. For example, the virtual machine agent 504 may reformat commands from the storage environment 514 into a format expected by APIs of the virtual machine management platform 503. This is because the virtual machine agent 504 is configured to be compatible with the specific APIs, communication protocols, data storage formats, commands and operations, and/or other services and functionality implemented by the computing environment 508.

Similarly, the agent component 502 interacts with the storage agent 506 in order to communicate with the storage environment 514. The storage agent 506 may be used to access various storage services configured to perform full backups of data, incremental backups of data, full restores of data, incremental restores of data, long term retention of backed up data, data migration between various storage locations and providers, snapshot management, etc. The storage agent 506 in may be capable of reformatting, modifying (e.g., adding, removing, and/or replacing parameters, variables, statements, text, and/or other data within commands), and/or replacing (e.g., replacing a command with another command mapped to the command and formatted to be compatible with the storage environment 514) commands and data (e.g., repackaging snapshot data into a format compatible with a snapshot management service; transforming metadata into a metafile; etc.) from the agent component 502 and the computing environment 508. The commands are reformatted, modified, and/or replaced as commands that are compatible with the storage environment 514. This is because the storage agent 506 is configured to be compatible with the particular APIs, communication protocols, data storage formats, commands and operations, and/or other services and functionality implemented by the storage environment 514.

The agent component 502 may be hosted within any environment or by any component, such as within the computing environment 508, within the storage environment 514, within a separate computer, within a cloud computing environment, as a virtual machine, using hardware and/or software, or any combination thereof. Similarly, the virtual machine agent 504 may be hosted within any environment or by any component, such as within the agent component 502, separate from the agent component 502, within the computing environment 508, within the storage environment 514, within a separate computer, within a cloud computing environment, as a virtual machine, using hardware and/or software, or any combination thereof. Furthermore, the storage agent 506 may be hosted within any environment or by any component, such as within the agent component 502, separate from the agent component 502, within the computing environment 508, within the storage environment 514, within a separate computer, within a cloud computing environment, as a virtual machine, using hardware and/or software, or any combination thereof.

In an embodiment, a set of agents may be hosted to manage backups of virtual machines hosted within the computing environment 508 to the storage environment 514 and/or to perform restores of backed up data from the storage environment 514 to the computing environment 508. An agent within the set of agents may correspond to one of or a combination of an agent component 502, a storage agent 506, and/or a virtual machine agent 504 that operate together to coordinate backups and restores between the computing environment 508 and the storage environment 514. In an example, the set of agents are configured to manage the backup transfer of snapshots at a virtual machine granularity from the computing environment 508 to the storage environment 514. For example, the storage agent 506 and/or the virtual machine agent 540 may facilitate a full backup of the virtual machine 510 and/or a subsequent incremental backup of changed/delta data of the virtual machine 510 since a prior backup of the virtual machine 514 to the storage environment 514.

In an embodiment, the set of agents may be stateless agents. That is, requests and information communicated between an agent, such as the agent component 502, and the computing environment 508 and storage environment 514 comprises all data needed to execute the request without the need to maintain state information between requests. Thus, if a first agent component (e.g., agent component 502) performed a prior backup of the virtual machine 510, then a second agent component (e.g., an agent component not illustrated) could perform a subsequent backup of the virtual machine 510 using a metafile stored within the storage environment 514. This is because the metafile comprises information needed to perform the subsequent backup, such as where the metafile comprises a prior snapshot identifier of a prior snapshot backed up during the prior backup. If the first agent component (e.g., the agent component 502) fails, then the second agent component can takeover for the first agent, such as by performing subsequent backups, restarting a failed backup, resuming a backup, etc.

Because the agents are stateless and metafiles of backups are stored and available to the agents from the storage environment 514, any agent (e.g., agent component 502 or a different agent component not illustrated) can perform a backup for any virtual machine from the computing environment 508 to the storage environment 514. Since agents can be hosted as virtual machines, new agents can be quickly and efficiently created as new virtual machines in order to provide additional agents for performing backup and restore operations between the computing environment 508 and the storage environment 514. For example, a new virtual machine may be created to host a new agent based upon a threshold resource consumption being reached (e.g., a threshold amount of available resources have been used up) and/or based upon a latency threshold being reached (e.g., backup operations are taking too long to complete because the current number of agents is a bottle neck). Similarly, agents can be quickly decommissioned by deleting virtual machines hosting the agents, which can free up resources otherwise wasted in hosting underutilized agents. In this way, any agent can perform a backup and restore for any virtual machine using information within metafiles comprising all information used by the virtual machine management platform 503 to create full snapshots and incremental snapshots. Thus, backup and restore workloads and data transfers can be load balanced amongst the set of agents to alleviate any bottlenecks from a particular agent.

The agent component 502 may utilize the storage agent 506 to perform various operations and invoke various commands at the storage environment 514 because the storage agent 506 is configured to interact with APIs and services of the storage environment 514. In an example, the agent component 502 can utilize the storage agent 506 to identify, create, delete, and/or manage resources used for backing up virtual machine from the computing environment 508 to the storage environment 514, such as the management of volumes, folders, and/or files used for backup and restore operations. In another example, the agent component 502 can utilize the storage agent 506 to schedule backup jobs performed by a backup service and/or the snapshot management service hosted by the storage environment 514. In another example, the agent component 502 can utilize the storage agent 506 to access an inode mapping used to track virtual disk file names of backed up data within the storage environment 514 corresponding to backups of virtual disks of virtual machines within the computing environment 508.

The agent component 502 may determine that a backup is to be performed for the virtual machine 510 to the storage environment 514. The backup may be performed to the storage environment 514 because the computing environment 508 does not maintain and storage snapshots as long term backups. The backup may be triggered based upon a threshold amount of time occurring since a prior backup of the virtual machine 510 and thus an incremental backup is to be performed. The backup may be triggered based upon the virtual machine 510 being created and thus an initial full backup is to be performed. The backup may be triggered based upon a backup schedule maintained by the backup service of the storage environment 514 indicating that the backup is to be performed. The backup may be triggered based upon a threshold amount of data being changed within virtual disks of the virtual machine 510. The backup may be triggered based upon a snapshot occurring.

Figure 5A:
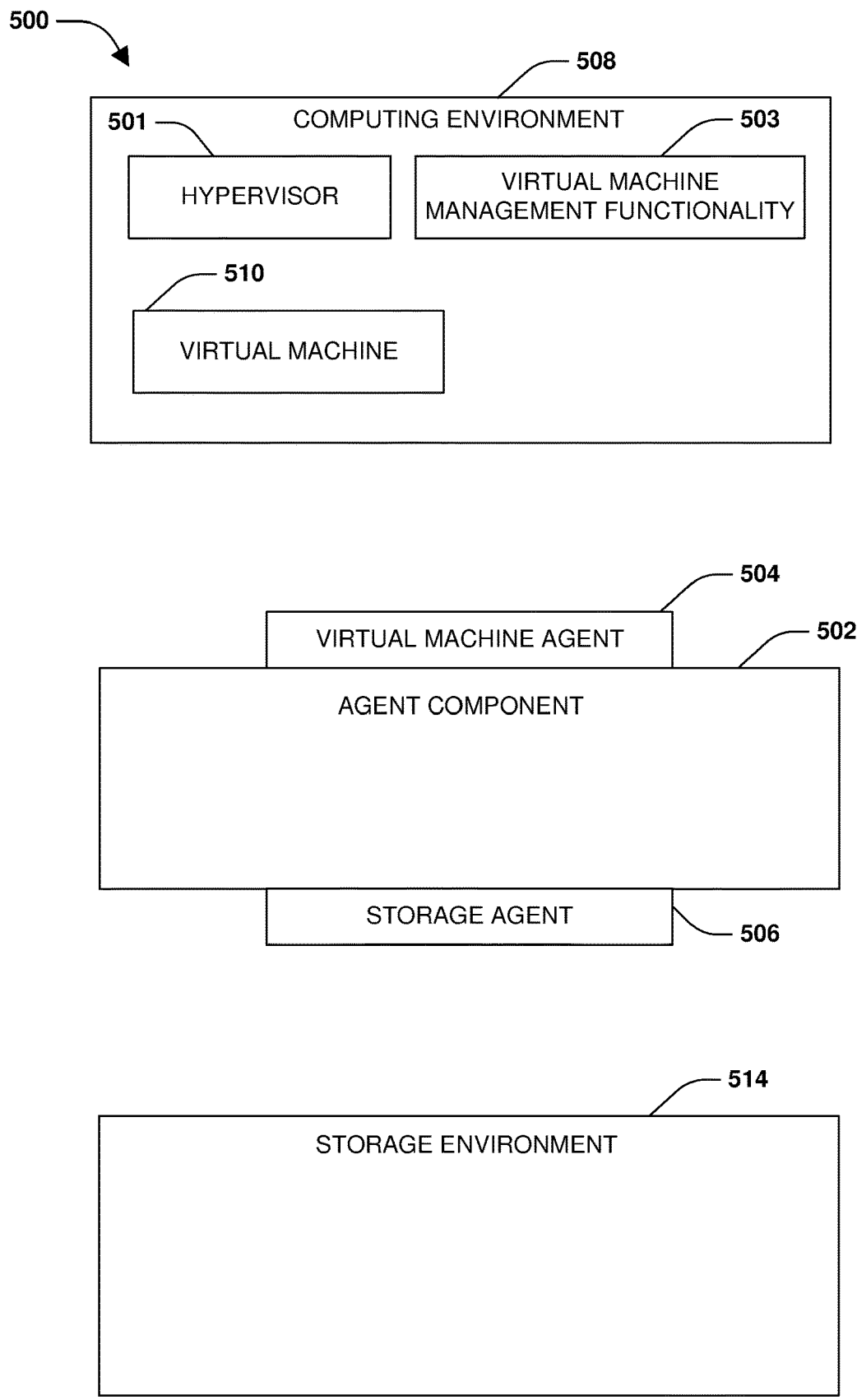
FIG. 5A is a block diagram illustrating an example system for virtual machine backup from a computing environment to a storage environment, where a virtual machine is hosted within the computing environment.
Figure 5B:
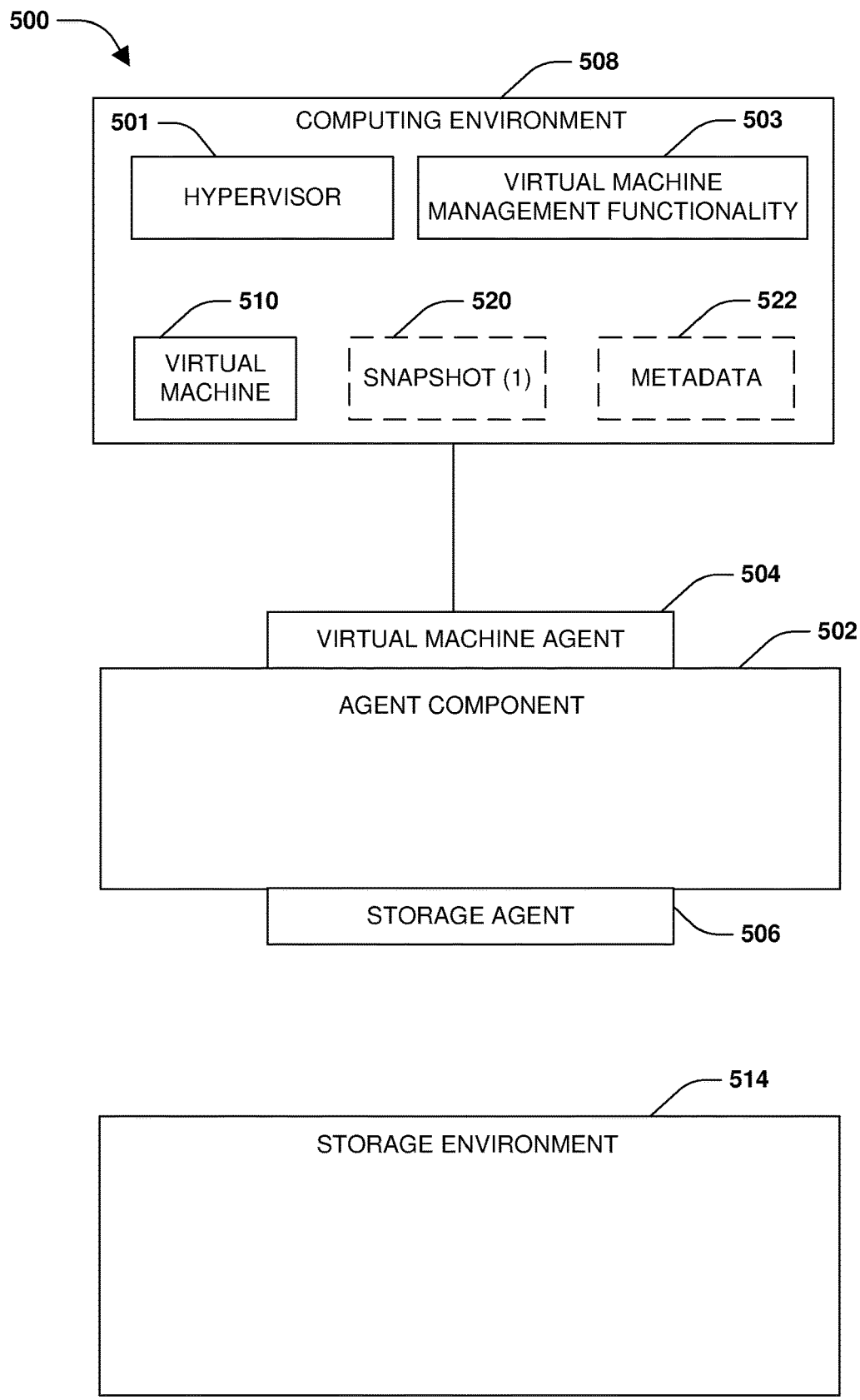
FIG. 5B is a block diagram illustrating an example system for virtual machine backup from a computing environment to a storage environment, where a snapshot of a virtual machine is created.

At 402 (of FIG. 4's exemplary method 400), the agent component 502 utilizes the virtual machine agent 504 to interact with APIs of the virtual machine management platform 503 of the computing environment 508 to initiate the creation of a snapshot 520 of the virtual machine 510 hosted by the computing environment 508, as illustrated by FIG. 5B. In an example, the backup is an initial full baseline backup of the virtual machine 510. The snapshot 520 may capture a state of virtual disks of the virtual machine 510 at a point in time. The virtual machine management platform 503 may temporarily store the snapshot 520 within the computing environment 508. However, the snapshot 520 will be deleted after being backed up to the storage environment 514 due to the prohibitive cost and overhead of maintaining snapshots within the computing environment 508.

The virtual machine management platform 503 (e.g., virtual machine management functionality provided by the virtual machine management platform 503) may generate metadata 522 describing the snapshot 502, and store the metadata 522 within the computing environment 508. At 404, the metadata 522 of the snapshot 520 is retrieved from the computing environment 508 by the virtual machine agent 504. The virtual machine agent 504 may track, such as within memory (e.g., memory of a computing device hosting the virtual machine agent 504, such as memory within the storage environment 514), the metadata 522 of the snapshot 520. The metadata 522 may comprise a snapshot identifier of the snapshot 520, virtual disk information of the virtual disks captured by the snapshot 520, and/or a variety of other information. For example, the metadata 522 may comprise a disk layout of the virtual disks of the virtual machine 510 captured by the snapshot 520, disk attributes of the virtual disks, file information of files within the virtual disks, a list of inodes of the files, and/or a variety of information relating to the snapshot 520. In an example, the snapshot identifier is a universal snapshot identifier mapped to an identifier used by the computing environment 508 and/or the virtual machine management platform 503 to refer to the snapshot 520. The snapshot identifier may be assigned to the snapshot 520 when the snapshot 520 is created. In this way, the snapshot identifier can be subsequently provided to the computing environment 508, such as to the virtual machine management platform 503, to perform an incremental backup of changes to the virtual machine 510 since the snapshot 520 was created by the virtual machine management platform 503. The snapshot identifier can also be used by the storage environment 514 to identify a common snapshot of the virtual machine 510 that is common to both the computing environment 508 and the storage environment 514. The common snapshot may also be used for the incremental backup to backup changed data between the common snapshot and a subsequent snapshot.

In an example, the metadata 522 is retrieved from the computing environment 508 by the virtual machine agent 504 as a volume attribute (e.g., the metadata 522 may be populated within an attribute of a volume). In another example, the metadata 522 is serialized by the computing environment 508 into a metadata image that is transmitted as volume attributes from the computing environment 508 to the virtual machine agent 504. In another example, the metadata 522 is read by the virtual machine agent 504 from an active file system associated with the computing environment 508. In this way, the virtual machine agent 504 interacts with APIs, storage, services, and/or other functionality of the computing environment 508 such as the virtual machine management platform 503 and the hypervisor 501 to facilitate the creation of the snapshot 520 and the acquisition of the metadata 522.

Figure 5C:
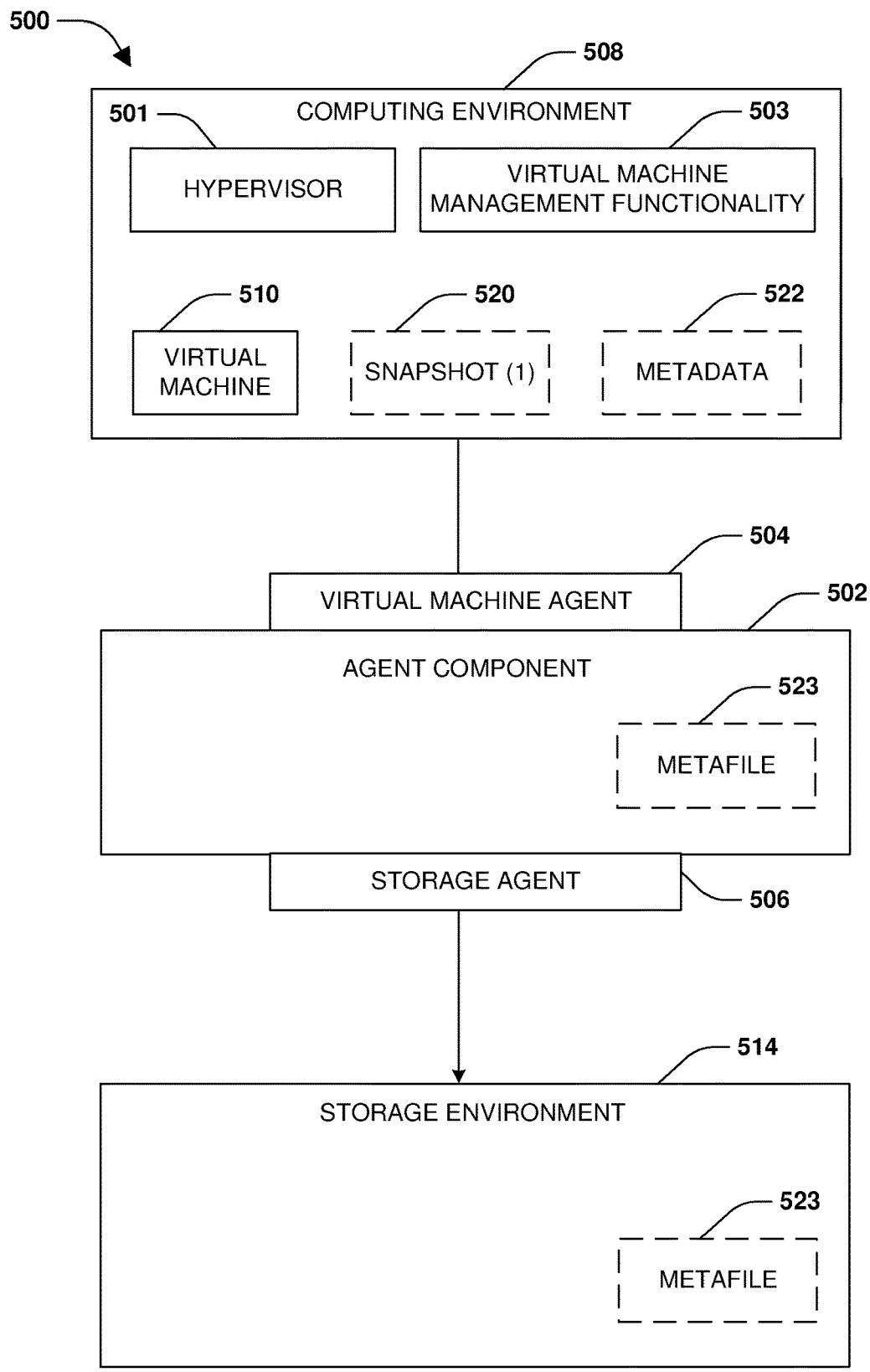
FIG. 5C is a block diagram illustrating an example system for virtual machine backup from a computing environment to a storage environment, where a metafile is created from metadata of a snapshot.

The virtual machine agent 504 uses the metadata 522 to generate a metafile 523 that can be stored within the storage environment 514 in a format that can be subsequently interpreted and used by any agent component and/or service hosted by the storage environment 514 for performing a subsequent incremental backup of the virtual machine 510. The metafile 523 is transferred from the agent component 502, through the storage agent 506, to the storage environment 514, as illustrated by FIG. 5C. The metafile 523 may be stored in a volume within which the snapshot 520 of the virtual machine 510 is to be backed up within the storage environment 514. The metafile 523 may be transferred to the storage environment 514 before a data mover is invoked by the agent component 502 to transfer the data of the snapshot 520 from the computing environment 508 to the storage environment 514 for backing up the snapshot 520 to the storage environment 514. This allows for restartability of the transfer of the snapshot 520 in the event the transfer is interrupted or aborted. This is because information within the metafile 523 such as the snapshot identifier of the snapshot 520 can be used by the agent component 502 or any other agent component 502 to restart the transfer of the snapshot 520 from the computing environment 508 to the storage environment 514. The snapshot identifier can be used to identify the snapshot 520 within the computing environment 508 for restarting the transfer.

Figure 5D:
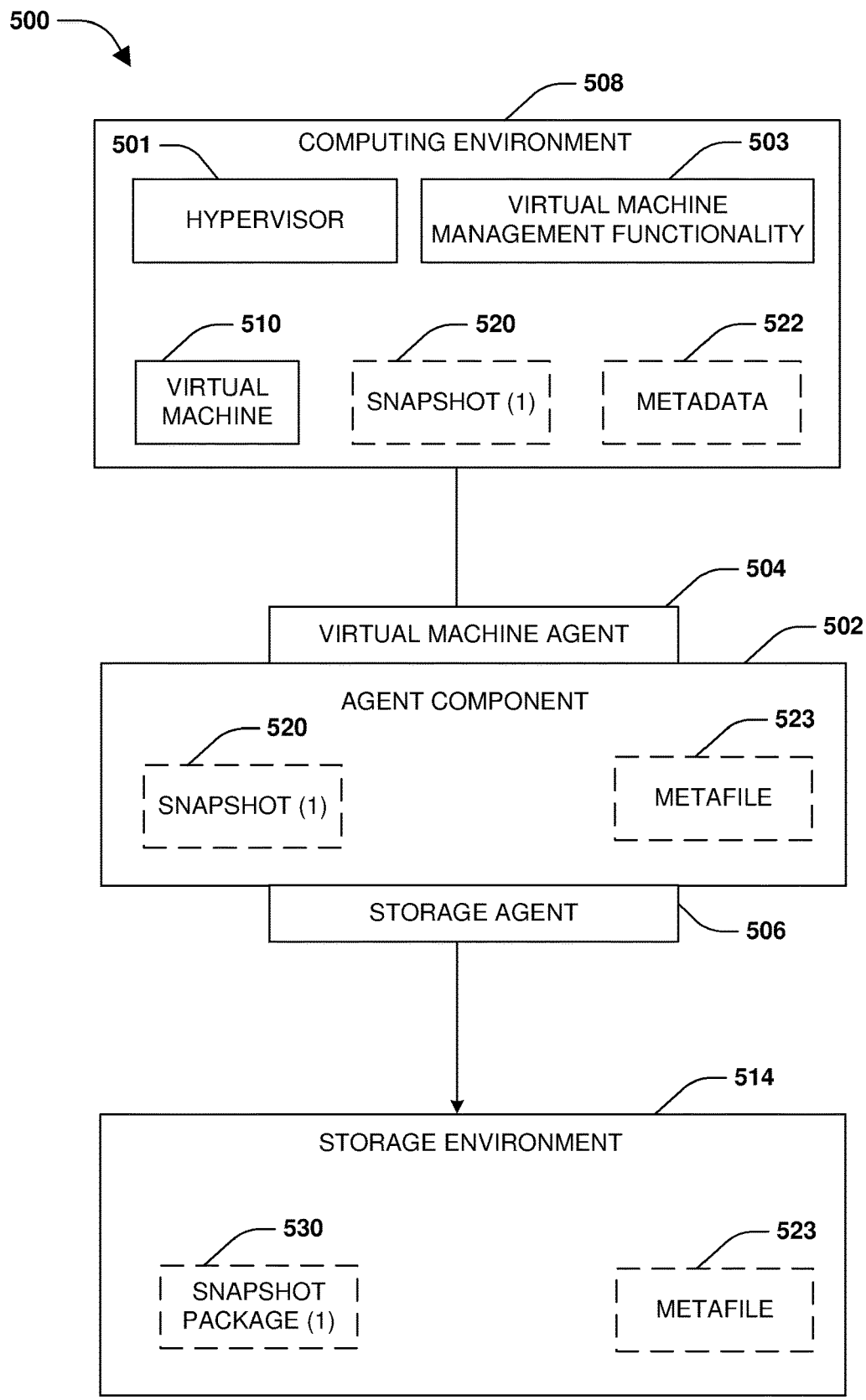
FIG. 5D is a block diagram illustrating an example system for virtual machine backup from a computing environment to a storage environment, where a snapshot package and a metafile are stored within the storage environment.

At 406, the snapshot 520 is retrieved from the computing environment 508 by the agent component 502 through the virtual machine agent 504, as illustrated by FIG. 5D. For example, the virtual machine agent 504 may utilize the data mover, capable of accessing and moving data stored within the computing environment 508, to retrieve data of the snapshot 520. Because the snapshot 520 is to be transferred through the storage agent 506 to the storage environment 514 for management by services of the storage environment 514 (e.g., the snapshot management service, the backup service, etc.), the snapshot 520 is reformatted into a format compatible with and understood by APIs of the service. Accordingly, the agent component 502 packages data of the snapshot 520 received from the computing environment 508 into a snapshot package 530. The snapshot package 530 is formatted into a protocol format used by the services of the storage environment 514, such as into a snapshot service protocol understood by snapshot functionality and APIs of the snapshot management service associated with the storage environment 514.

At 408, the snapshot package 530 is transmitted from the agent component 502 through the storage agent 506 to the storage environment 514, such as for storage within a volume maintained by the storage environment 514. Before the snapshot package 530 is transmitted to the storage environment 514, the agent component 502 may verify that the metafile 523 is accessible at the storage environment 514. This is because the metafile 523 can be used to restart the transfer of the snapshot package 530 to the storage environment 514 in the event an error or other issue occurs. Once the metafile 523 is verified as being stored at the storage environment 514, then the metafile 523 may be removed from the agent component 502.

The storage environment 514 may maintain a separate folder for each virtual machine of the computing environment 508 into which snapshots of the virtual machines (snapshot packages) are to be stored. The snapshots of the virtual machines (snapshot packages) may be stored as separate individual files per virtual disk of each virtual machine. For example, snapshot packages of a first virtual machine may be stored within a first folder and snapshot packages of a second virtual machine may be stored within a second folder. A snapshot package of a first virtual disk of the first virtual machine may be stored as a first file within the first folder and a snapshot package of a second virtual disk of the first virtual machine may be stored as a second file within the first folder. In this way, snapshots of virtual machines hosted by the computing environment 508 may be backed up as snapshot packages and/or incremental data to the storage environment 514.

In response to the snapshot package 530 successfully being transferred and stored within the storage environment 514 with the metafile 523, the snapshot 520 may be deleted from the computing environment 508. For example, the virtual machine agent 504 may interact with APIs of the virtual machine management platform 503 in order to instruct the virtual machine management platform 503 to delete the snapshot 520. The computing environment 508 may host a substantial number of virtual machines, and retaining numerous snapshots for each virtual machine would be cost and resource prohibitive due to the cost and overhead of maintaining snapshots within the computing environment 508. Thus, deleting snapshots after the snapshots are backed up to the storage environment 514 reduces storage usage and costs because maintaining snapshots within the computing environment 508 would otherwise be prohibitively expensive.

Once the snapshot package 530 has been stored within the storage environment 514, services of the storage environment 514 may provide robust data protection and storage efficiency for the snapshot package 530. In an example, multiple copies of the snapshot package 530 may be stored within various locations and at various storage providers (e.g., on-premise storage, cloud storage, etc.) to improve data redundancy and protection of backups of the virtual machine 510. Based upon storage costs, available storage, and/or other factors, the snapshot package 530 may be migrated between various location and storage providers (e.g., the snapshot package 530 may be migrated to lower cost storage with higher latency if the snapshot package 530 is predicted to not be accessed for a threshold amount of time). In another example, deduplication, encryption, compression, and/or other storage efficiency may be implemented by the storage environment for the snapshot package 530.

Figure 5E:
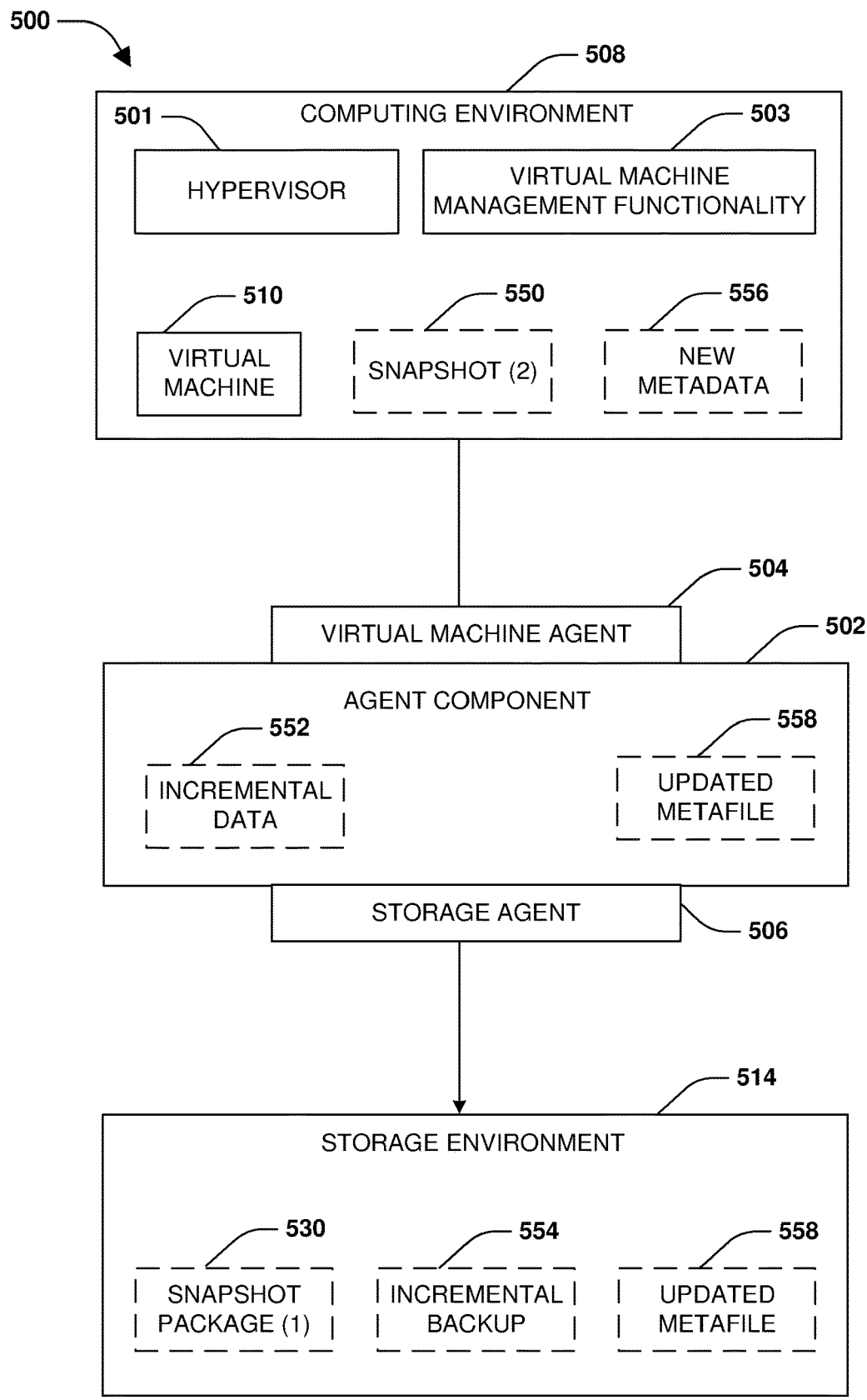
FIG. 5E is a block diagram illustrating an example system for virtual machine backup from a computing environment to a storage environment, where an incremental backup is performed.

FIG. 5E illustrates an example of an incremental backup of the virtual machine 510 being performed by the agent component 502. In an example, an indication may be received that a second snapshot 550 of the virtual machine 510 is to be generated for incrementally backing up the virtual machine 510 to the storage environment 514 (e.g., a backup schedule maintained by the storage environment 514 may generate the indication or a timer may expire as the indication). Accordingly, the metafile 523 may be evaluated to identify the snapshot identifier of the snapshot 520 (e.g., the agent component 502 may retrieve the metafile 523 from the storage environment 514 for evaluation). A snapshot creation request, comprising the snapshot identifier, may be transmitted through the virtual machine agent 504 to the computing environment 508 to create the second snapshot 550. For example, an API of the virtual machine management platform 503 may expect/require a snapshot identifier of a prior snapshot (a common snapshot) that is to be used as part of the incremental backup. The computing environment 508 can use the snapshot identifier of the common snapshot in order to identify and compare the common snapshot to current data of the virtual machine 510 in order to identify incremental data of the virtual machine 510 to include within the second snapshot 550. The incremental data 552 may correspond to changed data within virtual disks of the virtual machine 510 since the snapshot 520 was created and backed up to the storage environment 514 as the snapshot package 530. In this way, the second snapshot 550 may represent the incremental data 552 corresponding to changed data since the prior backup of the snapshot 520 to the storage environment 514.

The virtual machine agent 504 may retrieve new metadata 556 of the second snapshot 550 from the computing environment 508, which may be tracked within memory of the virtual machine agent 504 (e.g., memory of a computing device hosting the agent component 502, such as memory within the storage environment 514. The new metadata 556 may comprise a second snapshot identifier of the second snapshot 550, virtual disk information of the virtual disks captured by the second snapshot 550, and/or a variety of other information. For example, the new metadata 556 may comprise a disk layout of the virtual disks of the virtual machine 510 captured by the second snapshot 550, disk attributes of the virtual disks, file information of files within the virtual disks, a list of inodes of the files, and/or a variety of information relating to the second snapshot 550. The agent component 502 may generate an updated metafile 558 based upon the new metadata 556. The agent component 502 may utilize the storage agent 506 to store the updated metafile 558 within the storage environment 514. In an embodiment, the agent component 502 may distribute metadata and/or metafiles (e.g., metafile 523) to various storage locations such as back to the computing environment 508. For example, the agent component 502 may send a set of metadata and/or metafiles to the computing environment 508 to be deserialized into a stream by the computing environment 508 for storage within a cache of the computing environment 508. In this way, information may be transmitted to the computing environment 508 to use for subsequent incremental backups and such.

The agent component 502 may utilize the virtual machine agent 504 and/or the data mover to acquire the second snapshot 550 from the computing environment as the incremental data 552. The agent component 502 may package the incremental data 552 into an incremental backup package 554 (a second snapshot package). The incremental backup package 554 may be formatted according the protocol format of the services of the storage environment 514. The incremental backup package 554 is transferred through the storage agent 506 to the storage environment 514 for storage. The incremental backup package 554 may be transferred after the updated metafile 558 has successfully been stored within the storage environment 514. In this way, the virtual machine 510 may be incrementally backed up to the storage environment 514 in a manner that reduces network bandwidth and resource utilization because only the incremental data 552 is transferred as opposed to all data of the virtual machine 510.

The snapshot packages and/or incremental data within the storage environment 514 may be used to restore virtual machines within the computing environment 508. A full restore of a virtual machine may be performed or an incremental restore may be performed. During a transfer of data between the computing environment 508 and the storage environment 514, such as a restoration process to restore the virtual machine 510, an error or abort command may be received or an error or abort may occur. Accordingly, the virtual machine 510 may be restored at the computing environment 508 using one or more snapshots stored by the storage environment 514 for the virtual machine 510.

In an embodiment, a metafile (e.g., the metafile 523, the updated metafile 558, etc.) may be used to map virtual machine disks at the computing environment 508 to equivalent virtual machine disk representations at the storage environment 514. If a virtual machine disk is updated during an incremental update, then an equivalent virtual machine disk representation is updated and vice versa. In an embodiment, the metafile may be used during a restore. If a particular virtual machine is to be restored (e.g., a virtual machine at the computing environment 508), then the mapping within the metafile may be used to identify the equivalent virtual machine disk representation to use for the restore. In an embodiment, a virtual machine disk representation at the storage environment 514 may have a virtual disk format such that the virtual machine disk representation may be directly utilized by a virtual machine (e.g., a new virtual machine may use the virtual machine disk representation as a virtual machine disk within which data accessible to the new virtual machine is stored) without additional formatting.

Figure 6:
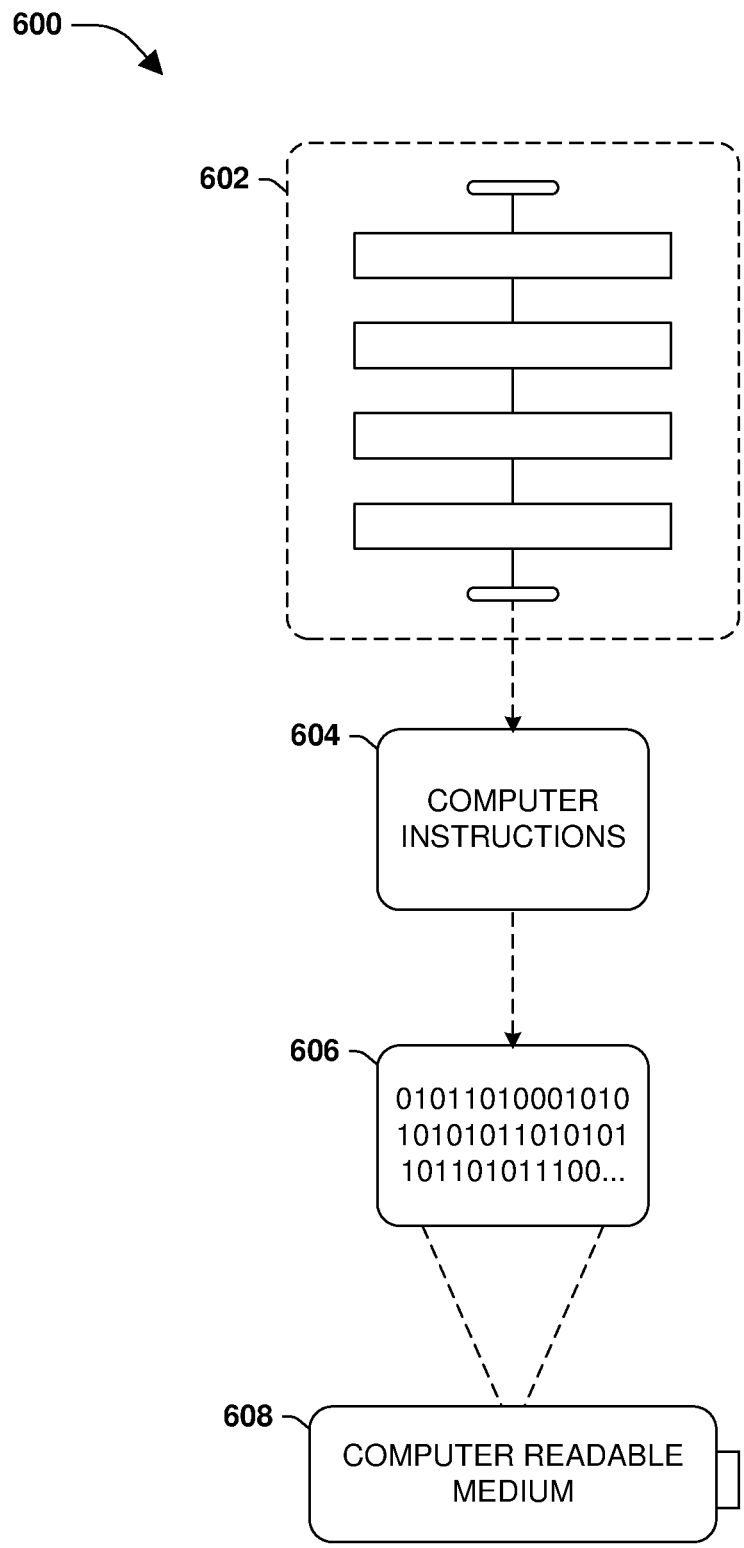
FIG. 6 is an example of a computer readable medium in which an embodiment of the invention may be implemented.

Still another embodiment involves a computer-readable medium 600 comprising processor-executable instructions configured to implement one or more of the techniques presented herein. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises processor-executable computer instructions 604 configured to operate according to one or more of the principles set forth herein. In some embodiments, the processor-executable computer instructions 604 are configured to perform a method 602, such as at least some of the exemplary method 400 of FIG. 4, for example. In some embodiments, the processor-executable computer instructions 604 are configured to implement a system, such as at least some of the exemplary system 500 of FIGS. 5A-5E, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
  generating, by a first agent, a first snapshot of a virtual machine of a computing environment and metadata associated with the first snapshot in a first format used by the computing environment, the metadata comprising a snapshot identifier identifying the first snapshot and virtual storage layout used by the virtual machine to store information captured by the first snapshot;

temporarily storing the first snapshot and the metadata in the computing environment;

transforming, by the first agent, a metadata image received from the computing environment, into a metafile for storage in a storage environment, a second agent transferring the metafile to the storage environment, wherein the metafile is interpretable and usable by an agent or service hosted by the storage environment and the computing environment serializes the metadata into the metadata image;

generating, by the first agent, a snapshot package by converting the first snapshot from the first format to a storage format, the storage format utilized by the storage environment for storing the first snapshot; and transferring the snapshot package to the storage environment, upon transfer of the metafile.

2. The method of claim 1, comprising:
deleting the first snapshot from the computing environment, upon transfer of the metafile and the snapshot package to the storage environment.

3. The method of claim 1, comprising:
load balancing incremental snapshot backup transfers from the computing environment to the storage environment between a plurality of agents.

4. The method of claim 1, wherein the metadata comprises at least one of a disk layout of virtual disks captured by the first snapshot, disk attributes of the virtual disks, or file information of files within the virtual disks.

5. The method of claim 1, wherein the snapshot identifier is a universal snapshot identifier mapped to an identifier used by the computing environment to refer to the first snapshot.

6. The method of claim 1, comprising:
verifying that the metafile is accessible to the storage environment before transferring snapshot package to the storage environment.

7. The method of claim 1, comprising:
restoring the virtual machine at the computing environment using one or more snapshots at the storage environment for the virtual machine.

8. A non-transitory machine readable medium comprising instructions for performing a method, which when executed by a machine, causes the machine to perform operations comprising:

generating, by a first agent, a first snapshot of a virtual machine of a computing environment and metadata associated with the first snapshot in a first format used by the computing environment, the metadata comprising a snapshot identifier identifying the first snapshot and virtual storage layout used by the virtual machine to store information captured by the first snapshot;

temporarily storing the first snapshot and the metadata in the computing environment;

transforming, by the first agent, a metadata image received from the computing environment, into a metafile for storage in a storage environment, a second agent transferring the metafile to the storage environment, wherein the metafile is interpretable and usable by an agent or service hosted by the storage environment and the computing environment serializes the metadata into the metadata image;

generating, by the first agent, a snapshot package by converting the first snapshot from the first format to a storage format, the storage format utilized by the storage environment for storing the first snapshot; and transferring the snapshot package to the storage environment, upon transfer of the metafile.

9. The non-transitory machine readable medium of claim 8, wherein the operations comprise:
sending, by the first agent, the metafile to the computing environment to be deserialized into a stream by the computing environment for storage within a cache of the computing environment.

10. The non-transitory machine readable medium of claim 8, wherein the operations comprise:
load balancing incremental snapshot backup transfers from the computing environment to the storage environment between a plurality of agents.

11. The non-transitory machine readable medium of claim 8, wherein the metadata comprises at least one of a disk layout of virtual disks captured by the first snapshot, disk attributes of the virtual disks, or file information of files within the virtual disks.

12. The non-transitory machine readable medium of claim 8, wherein the snapshot identifier is a universal snapshot identifier mapped to an identifier used by the computing environment to refer to the first snapshot.

13. The non-transitory machine readable medium of claim 8, wherein the operations comprise:
verifying that the metafile is accessible to the storage environment before transferring snapshot package to the storage environment.

14. The non-transitory machine readable medium of claim 8, wherein the operations comprise:
restoring the virtual machine at the computing environment using one or more snapshots at the storage environment for the virtual machine.

15. A computing device comprising:
a memory comprising machine executable code for performing a method; and
a processor coupled to the memory, the processor configured to execute the machine executable code to cause the processor to perform operations comprising:

generating, by a first agent, a first snapshot of a virtual machine of a computing environment and metadata associated with the first snapshot in a first format used by the computing environment, the metadata comprising a snapshot identifier identifying the first snapshot and virtual storage layout used by the virtual machine to store information captured by the first snapshot;

temporarily storing the first snapshot and the metadata in the computing environment;

transforming, by the first agent, a metadata image received from the computing environment, into a metafile for storage in a storage environment, a second agent transferring the metafile to the storage environment, wherein the metafile is interpretable and usable by an agent or service hosted by the storage environment and the computing environment serializes the metadata into the metadata image;

generating, by the first agent, a snapshot package by converting the first snapshot from the first format to a storage format, the storage format utilized by the storage environment for storing the first snapshot; and transferring the snapshot package to the storage environment, upon transfer of the metafile.

16. The computing device of claim 15, wherein the operations comprise:
deleting the first snapshot from the computing environment, upon transfer of the metafile and the snapshot package to the storage environment.

17. The computing device of claim 15, wherein the operations comprise:
  load balancing incremental snapshot backup transfers from the computing environment to the storage environment between a plurality of agents.

18. The computing device of claim 15, wherein the metadata comprises at least one of a disk layout of virtual disks captured by the first snapshot, disk attributes of the virtual disks, or file information of files within the virtual disks.

19. The computing device of claim 15, wherein the snapshot identifier is a universal snapshot identifier mapped to an identifier used by the computing environment to refer to the first snapshot.

20. The computing device of claim 15, wherein the operations comprise:
  verifying that the metafile is accessible to the storage environment before transferring snapshot package to the storage environment.

* * * * *